May 19, 1970      D. F. SCHNEIBLE      3,512,709
AMORTIZATION PAYMENTS COMPUTER
Filed Nov. 8, 1967
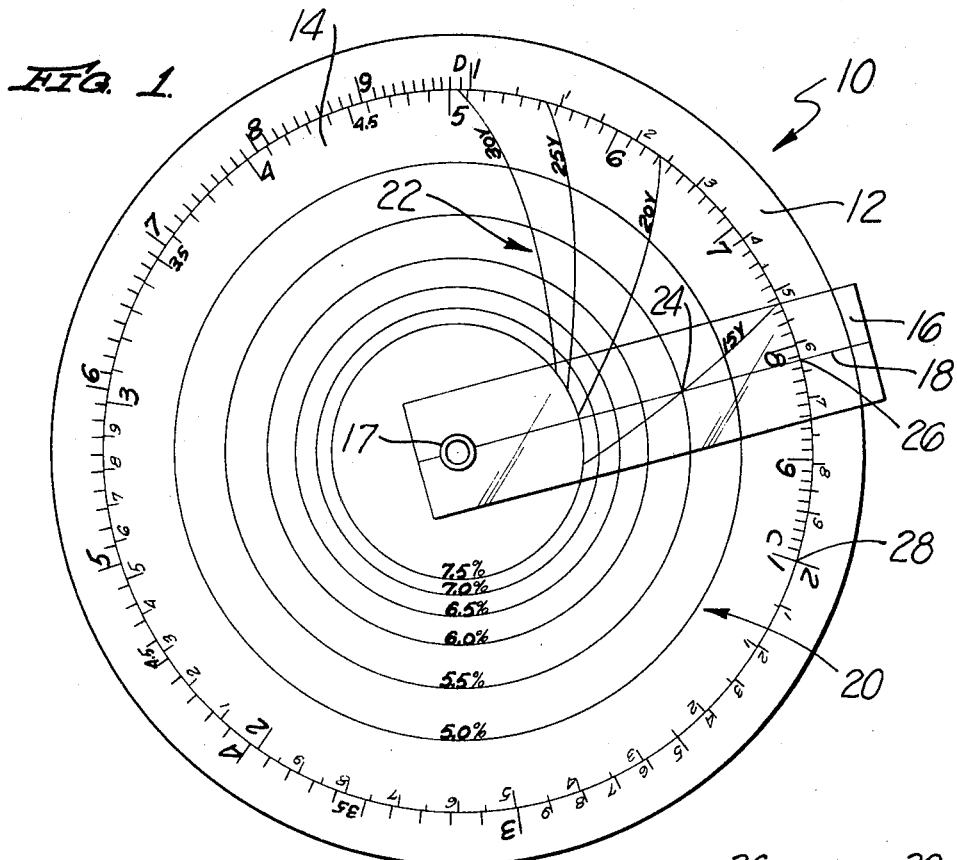
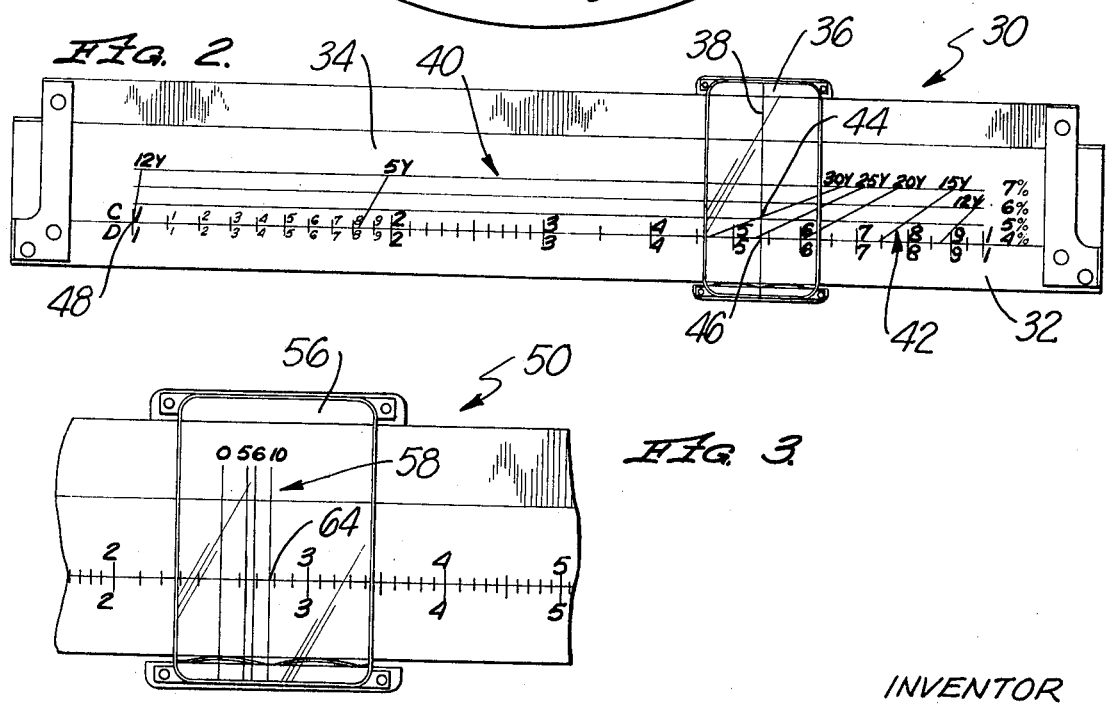
INVENTOR
DONELL F. SCHNEIBLE
BY John H. Crowe
AGENT

United States Patent Office 3,512,709
Patented May 19, 1970

---

3,512,709
AMORTIZATION PAYMENTS COMPUTER
Donnell F. Schneible, Sunnymead, Calif.; Eleanor H. Schneible, administratrix of said Donnell F. Schneible, deceased
Filed Nov. 8, 1967, Ser. No. 681,320
Int. Cl. G06c 27/00, 3/00; G06g 1/02
U.S. Cl. 235—78                     3 Claims

ABSTRACT OF THE DISCLOSURE

A device for determining the monthly payment required to amortize a loan. The device is similar to a slide rule in having a fixed member with a D scale, a movable member with a C scale and a cursor. The movable member has two sets of crossing lines representing interest rates and loan payoff periods. Setting a C scale index at a number on the D scale representing the amount of a loan and positioning the cursor hairline over an interest rate-loan payoff period line intersection on the movable member brings the hairline to the amount of the monthly amortization payment for the loan on the D scale.

Background of the invention

This invention relates to simplified means for rapid determination of the periodic amortization payment, required for the payoff of loans of varying terms at varying interest rates. More particularly, the invention relates to such means for determining the amounts of monthly payments for the amortization of long term loans such as those commonly employed for real estate financing purposes.

It is no secret that the sale of real estate (homes, business buildings, parcels of land, etc.) constitute a most active phase of business life in the United States and one which keeps an army of real estate brokers and salesmen busy handling transactions of many types. It is undoubtedly true that by far the great majority of home buyers, as well as buyers of real estate in other forms, finance at least part of their purchase prices by means of long term loans, payable over various lengths of time and at various interests rates. Typically, such a buyer contracts to pay his debt off in equal monthly amortization payments, the payment amount depending upon the size of his loan, the length of the applicable payoff period and the rate of interest involved. Since, every loan transaction involves these three variables (size of loan, payoff time and interest rate), the amount of monthly payment required to repay the resulting loan can vary through a wide range. The lending of money to be repaid in equal monthly installments is not confined to real estate transactions, and the same diversity of monthly amortization payment exists in the case of loans for other than real estate financing purposes for real estate loans themselves.

Where a loan at a given interest rate is to be repaid in equal monthly installments, the principal and interest proportions of the individual installments payments differ because the outstanding principal balance diminishes as the loan is gradually paid off. Since, as anyone familiar with bookkeeping or accounting principals is aware, the calculations necessary to arrive at monthly amortization payments for any given loan transaction are tedious and time consuming, various tables of loan amortization payments have been published for use by real estate brokers and salesmen, finance company personnel, and others having a need for such information. Typical of such tabulated material is a 224-page booklet published by Financial Publishing Company of Boston, entitled "Equal Monthly Loan Amortization Payments," which includes tables of monthly amortization payments for loans varying in amount from $100.00 to $20,000, in interest rate from 4½% to 10% and in payoff terms from 1 year to 40 years. Almost every page of this booklet has the monthly payments for amortization and 440 separate loans tabulated, which gives an idea of the great amount of loan information those engaged in some phase of, in some way connected with, the money lending field must deal with in the daily conduct of their business affairs, as well as illustrating the above-indicated necessity of having this information available in a form readily usable by such individuals.

While published compilations of loan payment data, such as the above-mentioned booklet, serve their intended purpose fairly well, they still leave something to be desired from the standpoint of speed and efficiency of use. Thus, in order to find the monthly amortization payment required in any given case from such a source, it is generally necessary to thumb through several pages of tables, looking for the proper areas of interest rate, payoff term and loan amount classification until a specific point of coincidence of these areas is found, possibly deep in the middle of a page of closely tabulated figures. This is a somewhat time consuming procedure, and one which can lead to error since it is not too difficult to be off a space or two when attempting to locate a specific item in closely tabulated columns of figures. In spite of these shortcomings, however, published tables of loan installment payments employ a virtual monopoly in the field of available sources for this kind of information today.

Summary of the invention

The loan information furnishing means of this invention is a simple device of lightweight construction, generally similar in physical appearance to an ordinary slide rule. The device, is however, quite different from a slide rule in its manner of use and functioning, carrying, in this connection, a unique pattern of markings on its face. These markings are essential to proper functioning of the device and quite different from any markings found on a standard slide rule. The device, in its preferred form, comprises a fixed member with a D scale, a movable member with a C scale and a cursor, fitted together to physically cooperate in the same way as their namesake slide rule counterparts. As in the case of the slide rule, the device can be of either straight or circular form.

The aforesaid pattern of markings on the face of the movable member of my novel device is, as indicated, critically necessary to proper functioning of that device. Also, as indicated, these markings are entirely unlike any of the markings on a conventional slide rule. More specifically, slide rule markings, or indicia, are of essentially scalar character, whereas those making up the pattern of markings on the movable member of my device are not scalar but, instead, delineative of scattered intersection points of crossing lines. The crossing lines preferably comprise two sets of mutually intersecting lines, a first set consisting of a plurality of lines which are parallel to the C scale of the movable member of my device (being concentric circles in the case of the circular, and straight lines in the case of the straight, embodiments of the device), and a second set consisting of lines which cut slantingly across those of the first set.

As will soon be seen, the above-described pattern of markings is employed in a way unlike that in which any of the markings of a conventional slide rule are employed to achieve a result unique to the novel device of this invention and impossible of achievement with any known slide rule, conventional or otherwise. Consequently, although my new device might resemble a slide rule in its physical features, there is clearly a new relationship between its markings and physical features not found in the latter.

The lines of one of the above-described sets represent individual rates of interest, and these of the other set, individual loan payoff terms, typically in years. The rates of interest are preferably represented by those lines parallel to the C scale, and the payoff terms by the remaining lines, although the reverse relationship can obtain within the scope of my invention, the lines are so positioned that the intersecting point of any two is aligned with a reading on the D scale corresponding to the monthly payment for a loan in an amount corresponding to any reading on the D scale opposite a C scale index at an interest rate and payoff term respectively equal to the interest rate and payoff represented by the two intersecting lines. By "aligned," as that term is employed above in reference to the relationship between the intersecting point of two lines on the movable member of my device and the indicated D scale reading thereon, is meant a linear relationship such as to simultaneously bring the intersecting point and D scale reading under the hairline of the cursor. Thus, as will now be apparent, the monthly amortization payment for a given loan at an interest rate and payoff term represented by a pair of intersecting lines on the face of the movable member of my device can be quickly determined by positioning an index of the C scale adjacent the D scale reading corresponding to the amount of the loan, adjusting the hairline of the cursor over the intersection of said rate of interest and payoff term lines and reading the amount of the monthly payment from the D scale by reference to the position of the hairline thereover. Proper positioning of the intersecting lines on the movable member of my device to permit its functioning in the above-described manner is not difficult, as will shortly appear.

The device of this invention can be manufactured inexpensively and in suitably compact and lightweight form for carrying in the pocket or purse for ready availability when needed. As will be apparent from the brief description above of its manner of use and functioning, the device can be employed with a minimum of effort for the rapid determination of monthly amortization payments within its range of "knowledge." By virtue of its simplicity of use and ability to produce quick results, the device provides a means of rapid access to loan amortization information absent the above-noted shortcomings of the tabulated sources of such information presently available.

It is thus a principal object of this invention to provide lightweight, easily carried means for rapidly furnishing loan amortization payment data which requires minimal skill, thought and effort for its successful operation.

It is another object of the invention to provide such means competitive costwise with published tables of loan amortization payment data of the type in common usage today, and capable of use in quicker and easier fashion, and with less chance of error, than are such tables.

Other objects, features, and advantages of the invention will appear in the light of disclosures to follow herein.

Brief description of the drawing

FIG. 1 is a front view of a circular embodiment of a device in accordance with this invention, adjusted to show the amount of monthly payment required for amortization of a hypothetical loan of predetermined size, payoff term and interest rate.

FIG. 2 is a front view of a straight embodiment of a device in accordance with this invention, adjusted to show the monthly payment required to amortize a second hypothetical loan.

FIG. 3 is a front view of a cursor of specialized design and function which can be employed on either a slide rule or a device in accordance with this invention, shown mounted on a fragmentary portion of a slide rule.

Description of the preferred embodiments

Considering now the drawing in greater detail, and directing attention first to FIG. 1, there is shown generally at 10 a circular embodiment of a device in accordance with this invention having a stationary, or base, member 12 with a D scale; a movable member with a C scale around its periphery, mounted in rotatable relationship with respect to the base member; and a cursor 16 with a hairline 18. These parts and features are fastened together in the same way as their namesake counterparts in a conventional circular slide rule to permit the rotation of movable member 14 relative to base member 12 and pivoting of the cursor 16 around a central point of support, as shown at 17 on the drawing.

Concentrically disposed on the face of the movable member 14 of device 10 are a plurality of circles representing respective rates of interest, at intervals of 0.5% from 5.0% through 7.5%, as shown. Diverging outwardly from points of intersection with the inner one of circles 20 (corresponding to a 7.5% interest rate) to the periphery of movable member 14 are four curved lines 22, representing payoff terms of 15, 20, 25 and 30 years, respectively. The circles 20 and lines 22 are positioned to intersect at the proper locations to assure functioning of the illustrated device in the manner taught herein. As will be evident, there is nothing sacred about the particular interest rates and payoff terms chosen for illustration in FIG. 1, and any feasible number of circles and curves, representing an equivalent number of interest rates and payoff terms, can, if desired, be included on the face of the device. I have merely chosen a few fairly representative interest rates and payoff terms for linear incorporation in the FIG. 1 embodiment of my invention since a few examples are here as effective as a larger number would be for the intended purpose.

There is no necessity that full circles and/or lines corresponding to circles 20 and/or lines 22 be employed on my device, so long as the critical points of intersection of these circles and lines are shown. In this connection, it is within the scope of my invention to employ full lines at key intervals and subdivision marks at lesser intervals therebetween, if desired. An example of this would be the use of appropriately located subdivision marks for each year of change in payoff term between each sequential pair of full lines representing the 15, 20, 25 and 30 year payoff terms in FIG. 1 along the arc segments of the interest rate circles between the 15 year and 30 year payoff term lines. Various alternative combinations and/or arrangements of lines or line segments within the scope of this invention will occur to those skilled in the art in the light of present teachings, all of which, are, of course, within the scope of my invention so long as they map or define critically situated intersection points for use in the manner, and for the purpose, taught herein.

As previously indicated, it is not necessary that the circular lines on the movable member of device 10 represent interest rates, and they could just as easily correspond to payoff term periods, in which case the curving lines 22 crossing the circles would then represent interest rates.

Although scales C and D on the movable and base members of device 10 are illustrated with fewer graduation marks than are present on the scales of a slide rule of typical size, this is of no moment insofar as effectiveness of the FIG. 1 drawing for illustrative purposes is concerned, and that drawing is obviously more than adequate, as it stands, to illustrate the workings and principles of my invention. In this connection, and as will be better understood in the light of subsequent disclosures herein, it is not necessary that my device have a C scale for proper functioning, although it must have a D scale. The foregoing notwithstanding, commercial versions of my device will probably have the same number of D scale, as well as C scale (where a C scale is present), graduations as equivalently sized slide rules to assure optimum scale reading accuracy in the use of the device.

To illustrate the manner in which device 10 is used, it is shown properly set to give the monthly payment required to amortize a loan in the amount of $20,000 at 5.5% interest for a term of 15 years. The amount of this monthly payment is read at the point where cursor hairline 18 intersects the D scale on fixed member 12, as shown at 26. The actual amount of this payment is $163.42 and while neither the FIG. 1 device nor any commercial counterpart can reasonably be expected to furnish an answer to that degree of accuracy, it is nevertheless able to give a close enough approximation to serve all practical purposes. As in the case of the conventional slide rule, longer D scale versions of my device will, of course, give more accurate answers than their shorter scale D counterparts. To achieve the above-indicated results with the FIG. 1 device, it is only necessary to place the index of its C scale opposite the $20,000 indicium on the D scale of member 12, as illustrated at 28, then position cursor 16 with its hairline 18 directly over the intersection of the 5.5% circle and 15 year payoff term line on movable member 14 of the device, as shown at 24. This procedure brings the hairline to the proper place on the D scale to supply the above-indicated answer.

There is no necessity for the above-described lines and circles on the movable member of device 10 to be positioned exactly as shown, even where identical interest rates and payoff terms are involved. The important thing is that the intersecting points of the circles and lines be properly aligned with the correct readings on scale D in accordance with present teachings. The are several ways in which the positions of the circles and lines can be correctly determined in this respect. For example, the interest rate circles can first be drawn, preferably variably spaced in somewhat the same pattern as those of FIG. 1 to insure more smoothly accurate curving of the payoff terms lines subsequently to be drawn, after which proper intersecting points for said payoff term lines are located on the circles. Smooth curves are then drawn through the corresponding intersection points on the circles to provide the payoff term lines.

FIG. 2 shows another device in accordance with this invention which is similar to a straight slide rule in the same way device 10 is similar to a circular one. Thus, device 30 has a body 32 with a D scale, a slide 34 with a C scale and a cursor 36 with a hairline 38, structurally and functionally similar to those parts and features of a standard slide rule, assembled to permit back and forth movement of the slide with its C scale adjacent the D scale on the body in the same manner that the slide member at said slide rule moves relatively to its body. Here again, as in the case of circular device 10, the movable member of the device (slide 34) is distinguishable from that of a slide rule by the presence of two sets of intersecting lines on its face, a first set consisting of lines parallel to the C scale on the slide, representing separate rates of interest, and a second set consisting of a plurality of sloping lines, representing separate loan payoff terms, each of which crosses, or can be extended to cross, each of the interest rate lines as shown or extended.

Device 30 is operable in essentially the same way as device 10, that is by moving an appropriate index on its C scale opposite the proper loan amount reading on the D scale, moving to the cursor hairline to the point at which the lines representing the interest rate and payoff term of the loan cross, and then reading the amount of the monthly payment from the D scale by reference to the hairline position thereover. To illustrate, FIG. 2 shows the device properly adjusted to show the monthly amortization payment required for a $10,000 loan at 5% interest for a term of 30 years, the point at which the proper index on the the C scale is positioned on the D scale being shown at 48, the intersection of the applicable interest rate and payoff term lines being shown at 44 and the point on the D scale where the amount of the monthly payment appears being shown at 46. The proper amount of this payment is $53.69 per month, and although device 30 is insufficiently accurate to show this exact amount, here again, as in the case of device 10, the answer is clearly enough indicated on the drawing to demonstrate the effectiveness of device 30 for its avowed purpose. In view of the reduced size of the FIG. 2 device, by comparison with the size of a standard 10-inch slide rule, the C and D scales have fewer graduation marks than those of such a slide rule, even fewer in fact, than their counterpart scales on the FIG. 1 device. This does not, however, render the FIG. 2 drawing any less effective for purposes of illustrating device 30, and exemplifying its method of use and manner of operation. In this connection, comments similar to the foregoing ones regarding the discrepancy in the number of scale graduation marks between device 10 and a physically comparable slide rule are equally applicable here. The same applicability is true with respect to the foregoing comments pertaining to the possible variations in number and positions of interest rate and payoff term lines on the movable member of circular device 10.

FIG. 3 depicts a cursor 56 uniquely designed for a specialized purpose which can be employed on the device of this invention or, alternatively, on a conventional slide rule. It does not, however, in the first instance, form a critical part of my new device. FIG. 3 shows cursor 56 installed on a standard slide rule 50 similarly to the way a conventional cursor would be installed thereon. Structurally, the cursor is in all respects substantially similar to a conventional cursor, the only difference between the two being the presence of four hairlines on the former, instead of only one, as in the case of the latter. These hairlines are shown at 58, and are numbered 0, 5, 6 and 10 respectively. The significance of the numbers will shortly be explained.

The multiple hairlines of cursor 56 serves a built-in multipliers which permit the direct reading of gross selling prices (net prices plus selling commissions) of homes or the like, from the C or D scale of a slide rule or device in accordance with this invention. Such a gross selling price corresponding to a particular net price is so determined by placing the 0 hairline of the cursor over the net selling price on the C or D scale of, for example, a slide rule, then noting the hairline reading on that scale for the 5, 6 or 10 hairline, assuming the selling commission to be 5, 6 or 10 percent, respectively. As will now be evident, the hairline numbers on cursor 56 correspond to selling commission percentages and, also as will be evident, any practicable number of such hairlines can be carried on the cursor, to make it more or less specialized or versatile, as desired.

The hairline spacings necessary to achieve the above-indicated results are arrived at by measuring the distances along a C or D scale corresponding to the reciprocals of those fractions by which net selling prices must be divided to determine gross sales prices at particular selling commissions, and then positioning the multiplier hairlines to the right of a 0 hairline distances corresponding to the values of the reciprocals in C or D scale distances.

Referring to FIG. 3 for specific illustration of the foregoing, cursor 56 is there shown with its C hairline over a hypothetical $25,000 starting figure on the C and D scales of slide rule 50. It is not necessary that the C or D scales coincide as shown in FIG. 3, since either scale can be used separately if desired. It is less confusing, however, if the scales are positioned as shown during usage of the cursor as taught herein. When cursor 56 has its 0 hairline over the $25,000 scale reading, as illustrated, the 10 hairline is spaced precisely far enough away therefrom to indicate on the scale the gross selling price of a $25,000 home where the salesman's commission is 10 percent. As any high school math student is aware, the gross selling price, under these circumstances, is equal to the net price, or $25,000, divided by 0.90. Dividing any number by 0.90 gives the same answer as multiplication of that number by the reciprocal of 0.90 or 1.11. Thus, the 10 hairline is here spaced to the right of the 0 hairline a distance equal to 1.11 along the C or D scale of slide rule 50 where it serves as a multiplier in that amount (1.11) of any net price figure over which the latter hairline is positioned to automatically reveal the gross selling price corresponding to that net where a 10 percent sales commission is charged. Getting down to specifics, the gross selling price of a home selling for $25,000 net, where the salesman's commission is 10 percent is equal to $27,800, which value is indicated by the position of the 10 hairline at 64 in FIG. 3. The proper position for the 5 and 6 hairlines on cursor 56 are determined similarly to the way the 10 hairline position is determined. In this connection, the gross selling price for a $25,000 home, where the selling commission is 5 percent, is $26,600, as indicated by the position of the 5 hairline on the C or D scale of slide rule 50 in FIG. 3.

While there are fewer graduation marks on the C and D scales of the FIG. 3 slide rule then would normally be seen on a real slide rule, this as in the case of all graduation mark discrepancies of a similar character heretofore mentioned in connection with FIGS. 1 and 2, does not detract from the illustrative effectiveness of the drawing.

It will be appreciated that the devices illustrated in the accompanying drawing are exemplary only of preferred embodiments of my invention, and that there are many possible variations of these embodiments within the scope of the invention. Some of these variaitons have already been touched upon, and others will occur to those skilled in the act in the light of present teachings. It is, of course, within the scope of my invention to provide scales such as those found on slide rules of different types; conversion scales (as, for example, a scale to convert square feet to acres or vice versa); and/or other non-critical indicia on either, or both, of the faces of my new device.

I claim:

1. A slide rule device having a pair of relatively movable members, one of said members having an edge adjacent a surface of the other member and means restraining said members to move relative to each other in a direction parallel to said edge; a first logarithmic scale on said one member, extending in one direction along said edge and having an index marking; a similar logarithmic scale on said surface of said other member adjacent said edge and extending in the same direction therealong for cooperation with said index marking; a first plurality of parallel lines on said one member parallel to and spaced from said edge; a further plurality of spaced lines on said one member, each extending obliquely across all the lines of said first plurality, the lines of one of said pluralities designating interest rates and the lines of the other plurality designating different numbers of time period units; and a cursor movable relative to both said members in the direction of said edge and having a hairline thereon extending across both said pluralities of lines and across both said scales, whereby said index marking may be positioned to indicate the amount of a loan, on said similar scale, and said cursor may be positioned with its hair line over the intersection of a selected time period line and a selected interest rate line to indicate, on said similar scale, the amount of each of equal payments per time unit.

2. A slide rule device as defined in claim 1 wherein said members are circular discs, said discs and cursor being pivoted about a common axis at the center of said discs.

3. A slide rule device as defined in claim 1 wherein said members are elongated rectilinear members, said edge being a longitudinal edge of one member.

References Cited

UNITED STATES PATENTS

| 2,544,224 | 3/1951 | Hachmuth | 235—84 |
| 2,564,227 | 8/1951 | Pepper | 235—70 X |
| 2,642,224 | 6/1953 | Christiansen | 235—88 X |
| 3,135,465 | 6/1964 | Squier et al. | 235—70 |
| 3,162,363 | 12/1964 | Lavie | 235—70 |

RICHARD B. WILKINSON, Primary Examiner

STANLEY A. WAL, Assistant Examiner

U.S. Cl. X.R.

235—70, 88